(12) United States Patent
Couper

(10) Patent No.: US 12,741,705 B2
(45) Date of Patent: Sep. 22, 2026

(54) CRAWLER TRACK COVER DEVICE

(71) Applicant: Mark Couper, Cle Elum, WA (US)

(72) Inventor: Mark Couper, Cle Elum, WA (US)

( * ) Notice: Subject to any disclaimer, the term of this patent is extended or adjusted under 35 U.S.C. 154(b) by 503 days.

(21) Appl. No.: 18/220,485

(22) Filed: Jul. 11, 2023

(65) Prior Publication Data

US 2025/0019017 A1 Jan. 16, 2025

(51) Int. Cl.
*B62D 55/084* (2006.01)
*B62D 55/088* (2006.01)

(52) U.S. Cl.
CPC ....... *B62D 55/0845* (2013.01); *B62D 55/088* (2013.01)

(58) Field of Classification Search
CPC ..... B62D 55/0845; B62D 55/088; B60J 11/10
USPC .......................................................... 206/304
See application file for complete search history.

(56) References Cited

U.S. PATENT DOCUMENTS 1,696,009 A * 12/1928 Mccormick ............ B65D 85/06 206/304.1
1,911,848 A * 5/1933 Ryerson ................. B65D 85/06 206/304.2
1,967,522 A 7/1934 Wengard
3,871,042 A * 3/1975 Farmer ................... B63B 34/54 114/346
4,366,992 A 1/1983 Enke
5,439,727 A * 8/1995 Riggs ................... B62D 43/005 428/128
6,116,415 A 9/2000 Rastelli
6,273,159 B1 8/2001 Page
7,478,723 B2 * 1/2009 Spater .................. B62D 43/005 206/304.1
10,017,217 B2 * 7/2018 Villarreal, Sr. ...... B62D 25/088
2004/0262941 A1 * 12/2004 Johnson .................. B60P 3/062 296/100.01
2007/0074796 A1 4/2007 Martin
2017/0334495 A1 * 11/2017 Gredler .................... B60J 11/06

FOREIGN PATENT DOCUMENTS

JP 3653631 3/2005

* cited by examiner

*Primary Examiner* — Minnah L Seoh
*Assistant Examiner* — Hosam Shabara

(57) ABSTRACT

A crawler track cover device for inhibiting debris from being dislodged from a track includes a cover that has an outer wall which is elongated along a longitudinal axis of the cover thereby facilitating the cover to conform to the shape of a track on a crawler vehicle. The cover is comprised of a resilient and tear resistant material thereby facilitating the cover to inhibit debris from being dislodged from the track when the cover is positioned over the track. In this way the cover inhibits the debris from striking a vehicle on a roadway when the crawler vehicle is being transported on a trailer. An elastomeric tube is attached to the cover for biasing the cover to close around the track when the cover is positioned over the track.

8 Claims, 7 Drawing Sheets

12
36
34
74
32
68
70
66
72
54
24
38
26
50
48
52
28
30

12
14
42
66
66
64
40
56
60
62
44

CRAWLER TRACK COVER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to track cover devices and more particularly pertains to a new track cover device for inhibiting debris from being dislodged on a track of a crawler vehicle while the crawler vehicle is being transported on a trailer. The device includes a cover that is shaped to fit around a track of the crawler vehicle, an elastomeric tube integrated into the cover to close the cover around the track and a pair of drawstrings integrated into the tube for tightening the cover around the track.

(2) Description of Related Art Including Information Disclosed Under 37 CFR 1.97 and 1.98

The prior art relates to track cover devices including a variety of wheel cover devices that are generally annular for enclosing a wheel of a vehicle. In no instance does the prior art disclose a track cover that has an oblong triangular shape for conforming to the shape of a track on a crawler vehicle for inhibiting debris from becoming dislodged from the track when the crawler vehicle is being transported on a trailer.

BRIEF SUMMARY OF THE INVENTION

An embodiment of the disclosure meets the needs presented above by generally comprising a cover that has an outer wall which is elongated along a longitudinal axis of the cover thereby facilitating the cover to conform to the shape of a track on a crawler vehicle. The cover is comprised of a resilient and tear resistant material thereby facilitating the cover to inhibit debris from being dislodged from the track when the cover is positioned over the track. In this way the cover inhibits the debris from striking a vehicle on a roadway when the crawler vehicle is being transported on a trailer. An elastomeric tube is attached to the cover for biasing the cover to close around the track when the cover is positioned over the track.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figures 1, 2:
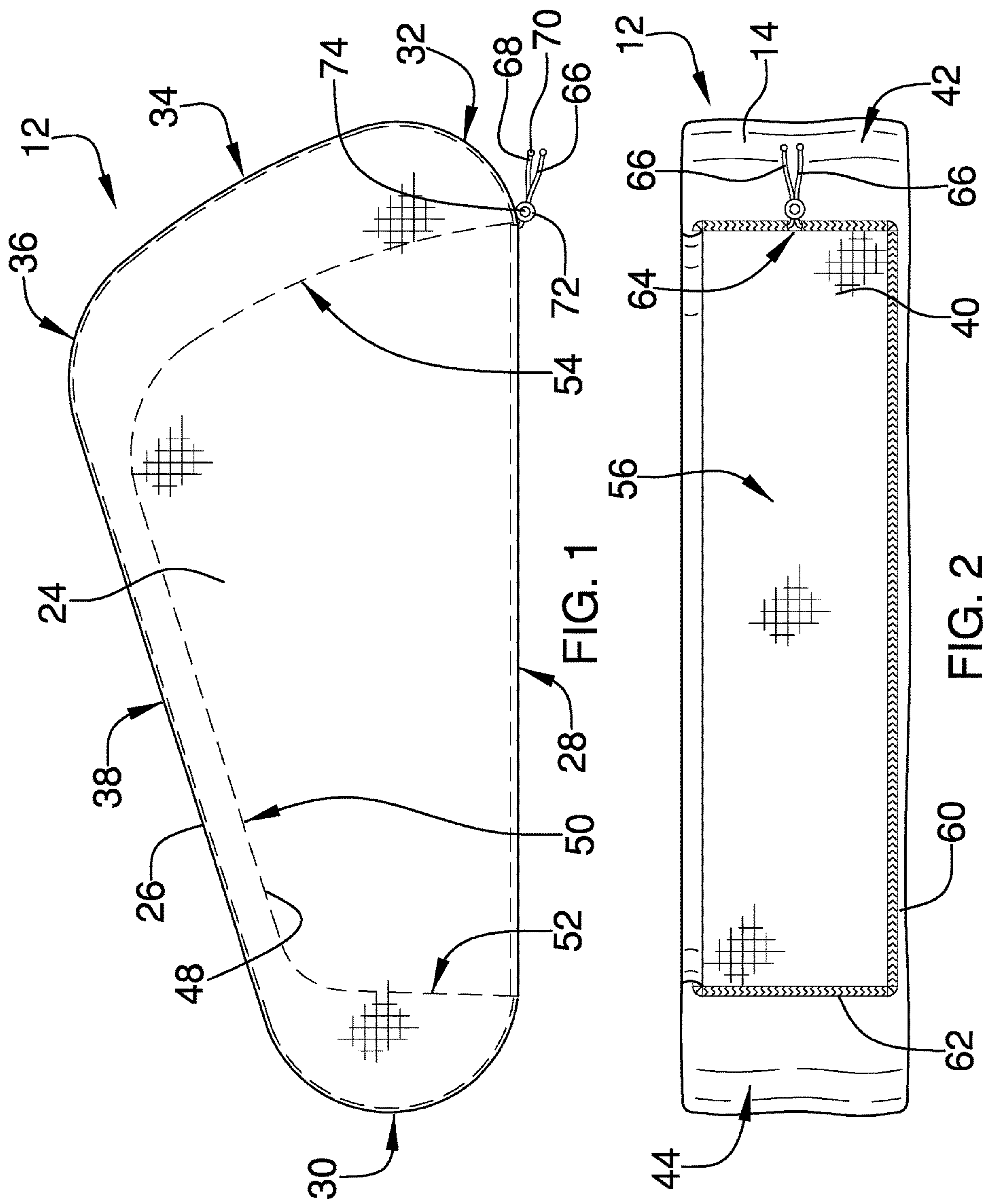
FIG. 1 is a left side phantom view of a crawler track cover device according to an embodiment of the disclosure.
FIG. 2 is a bottom view of an embodiment of the disclosure.
Figure 3:
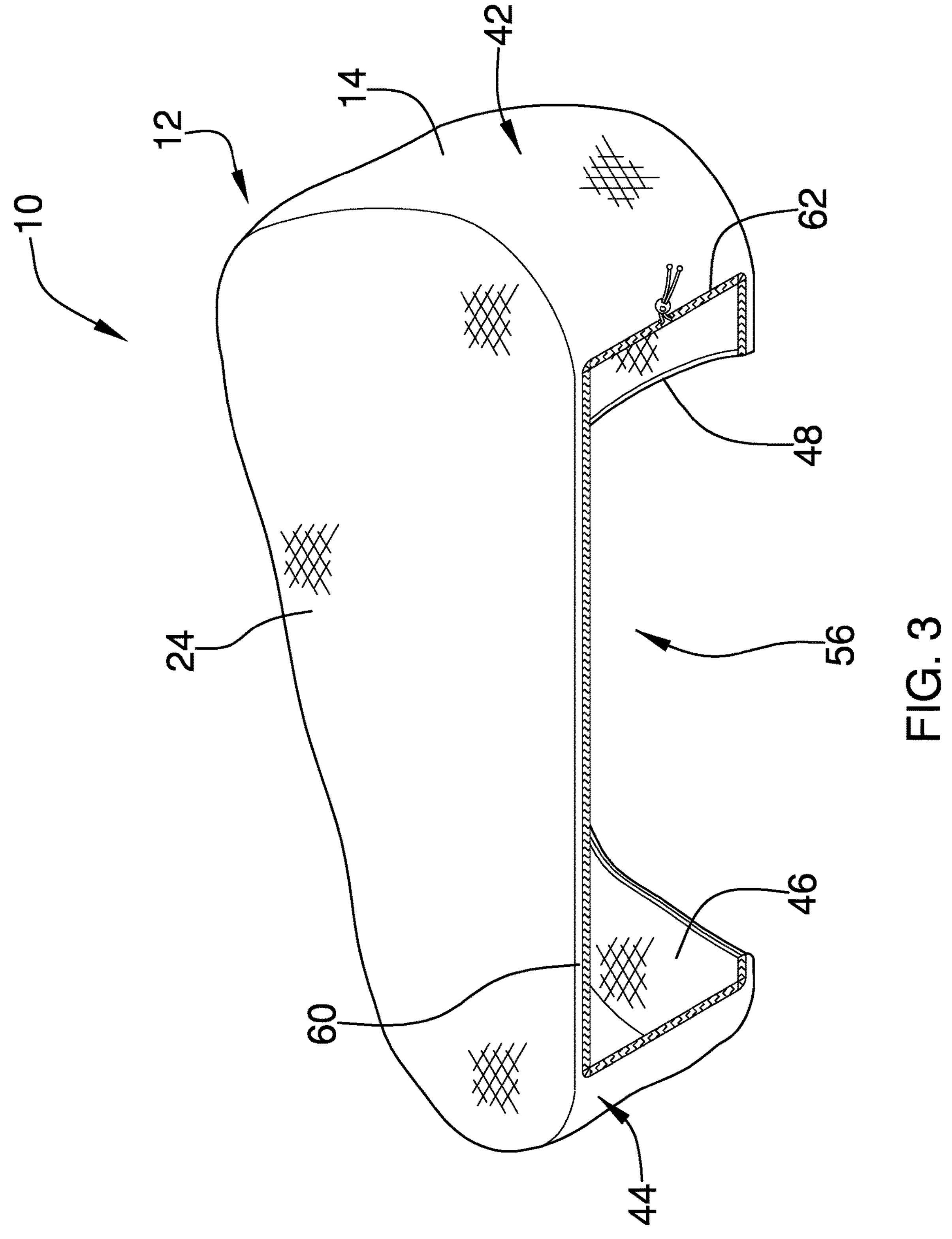
FIG. 3 is a bottom perspective view of an embodiment of the disclosure.

With reference now to the drawings, and in particular to FIGS. 1 through 8 thereof, a new track cover device embodying the principles and concepts of an embodiment of the disclosure and generally designated by the reference numeral 10 will be described.

As best illustrated in FIGS. 1 through 8, the crawler track cover device 10 generally comprises a cover 12 that has an outer wall 14 which is elongated along a longitudinal axis of the cover 12 such that the cover 12 has an oblong shape. In this way the cover 12 can conform to the shape of a track 16 on a crawler vehicle 18. The crawler vehicle 18 may be a skid steer, an excavator or other type of construction equipment that is driven by tracks. The cover 12 is comprised of a resilient and tear resistant material, including but not being limited to nylon or polyester, thereby facilitating the cover 12 to inhibit debris 20 from being dislodged from the track 16 when the cover 12 is positioned over the track 16. In this way the cover 12 inhibits the debris 20 from striking a vehicle on a roadway when the crawler vehicle 18 is being transported on a trailer 22. The debris 20 may be rocks, clumps of dirt and other debris 20 that commonly collects on tracks of construction equipment and which could potentially damage the vehicle on the roadway should the debris 20 strike the vehicle.

The cover 12 has a lateral wall 24 lying on a plane that is perpendicularly oriented with the outer wall 14. The lateral wall 24 has a perimeter edge 26 which has a lower side 28 extending between a front curve 30 and a back curve 32 and the perimeter edge 26 has a back side 34 extending between the back curve 32 and a top curve 36. Additionally, the perimeter edge 26 has an upper side 38 extending between the top curve 36 and the front curve 30 and the upper side 38 slopes downwardly between the top curve 36 and the front curve 30 such that the lateral wall 24 defines an approximately triangular shape with rounded corners. In this way the cover 12 can conform to a triangle track 16 that is commonly employed on skid steers, for example. The lateral wall 24 is elongated between the front curve 30 and the back curve 32 and the outer wall 14 has an upper side 40 intersecting the upper side 38 of the perimeter edge 26 of the lateral wall 24. The outer wall 14 has a back side 42 which intersects the back side 34 of the perimeter edge 26 of the lateral wall 24 and the outer wall 14 has a front side 44 which intersects the front curve 30 of the perimeter edge 26 of the lateral wall 24.

The cover 12 has a lateral panel 46 which lies on a plane that is oriented parallel to the lateral wall 24 and the lateral panel 46 has a lower edge 48 which has a lower side 50 that extends between a forward side 52 and a rear side 54 of the lower edge 48. The lower side 50 of the lower edge 48 is spaced from and extends along a line that is oriented parallel to the upper side 40 of the outer wall 14. The rear side 54 of the lower edge 48 is spaced from and extends along a line that is oriented parallel to the back side 42 of the outer wall 14 such that the rear side 54 of the lower edge 48 intersects a termination of the back side 42 of the outer wall 14. The forward side 52 of the lower edge 48 extends between the lower side 50 of the lower edge 48 and a termination of the front side 44 of the outer wall 14. Additionally, the termination of the front side 44 of the outer wall 14 and the termination of the back side 42 of the outer wall 14 defines a track opening 56 in the cover 12 for receiving the track 16 having the outer wall 14 resting on an outwardly facing surface 58 of the track 16. The outer wall 14 has a lip 60 extending between the termination of the back side 42 of the outer wall 14 and the termination of the front side 44 of the outer wall 14 and the lip 60 intersects the lower side 28 of the perimeter edge 26 of the lateral wall 24.

An elastomeric tube 62 is provided and the elastomeric tube 62 is attached to the cover 12. The elastomeric tube 62 extends along the lip 60 and the termination of the front side 44 and the termination of the back side 42 of the outer wall 14 of the cover 12. In this way the elastomeric tube 62 biases the track 16 opening to close around the track 16 when the cover 12 is positioned over the track 16 thereby facilitating the cover 12 to enclose debris 20 on the track 16. Furthermore, the elastomeric tube 62 has a hole 64 which extends into an interior of the elastomeric tube 62.

A pair of drawstrings 66 is provided and each of the pair of drawstrings 66 is disposed within the elastomeric tube 62. Each of the pair of drawstrings 66 extends outwardly through the hole 64 in the elastomeric tube 62 such that an end 68 of each of the drawstrings 66 is exposed. Furthermore, the pair of drawstrings 66 is drawable outwardly from the elastomeric tube 62 for tightening the track 16 opening in the cover 12 around the track 16 for retaining the cover 12 on the track 16. The drawstrings 66 includes a pair of balls 70 that is each attached to the end 68 of a respective one of the drawstrings 66. A slide 72 is provided and each of the drawstrings 66 slides through the slide 72. The slide 72 has a locking mechanism 74 which is biased into a locking condition for engaging the pair of drawstrings 66 to inhibit the pair of drawstrings 66 from sliding through the slide 72. The locking mechanism 74 is actuatable into an unlocked condition to facilitate the pair of drawstrings 66 to freely slide through the slide 72.

Figure 4:
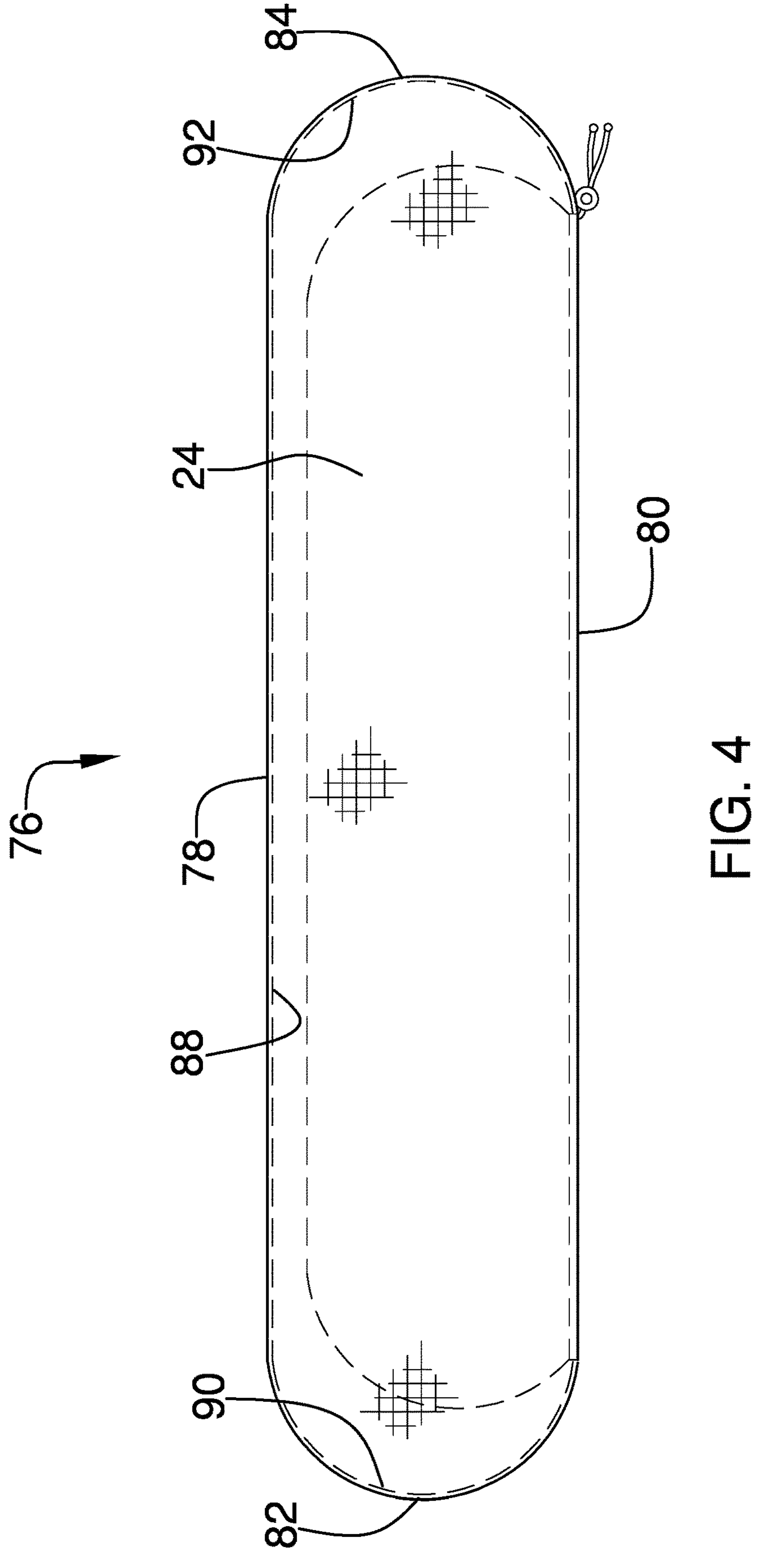
FIG. 4 is a left side view of an alternative embodiment of the disclosure.
Figure 5:
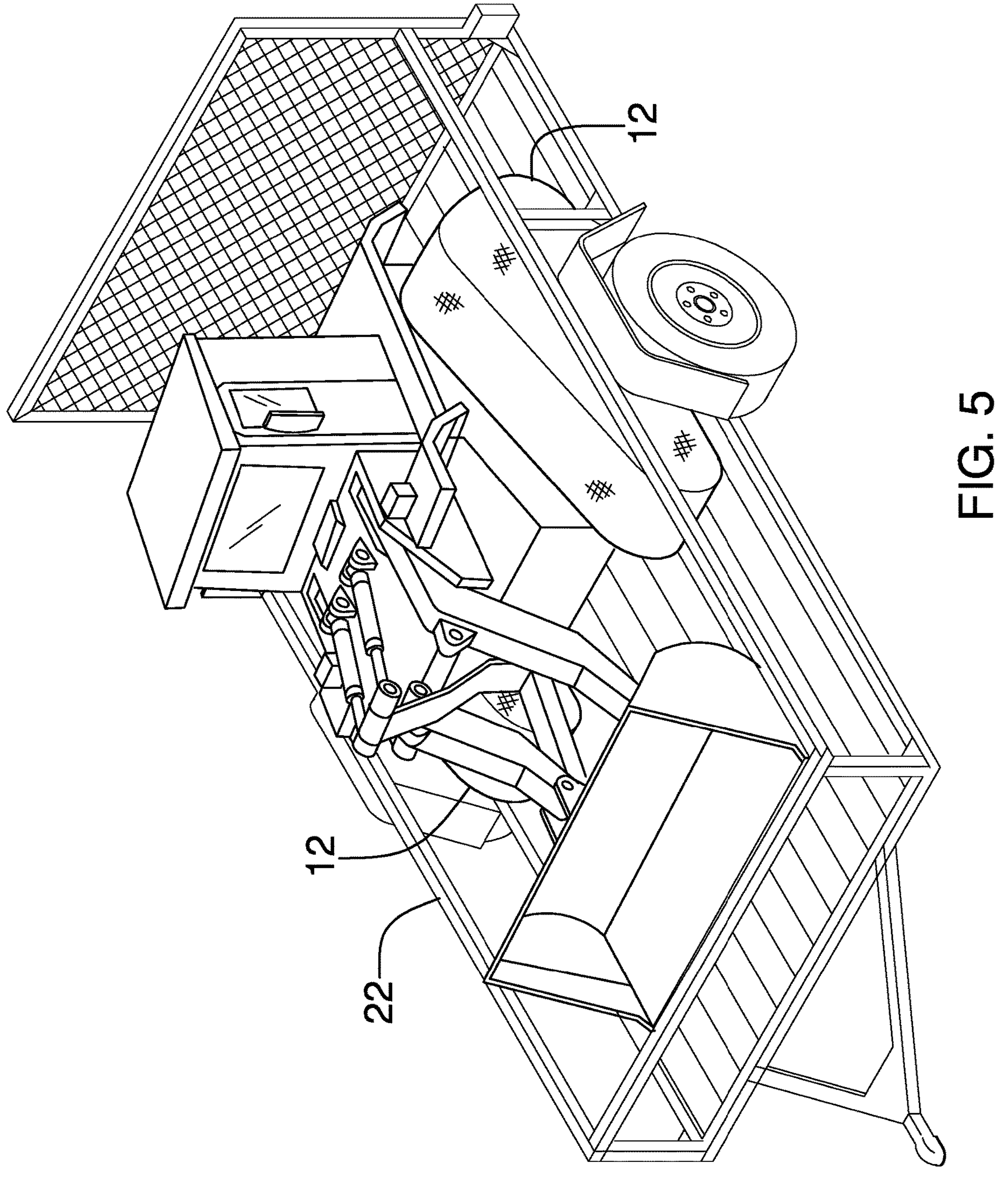
FIG. 5 is a perspective in-use view of an embodiment of the disclosure.
Figure 6:
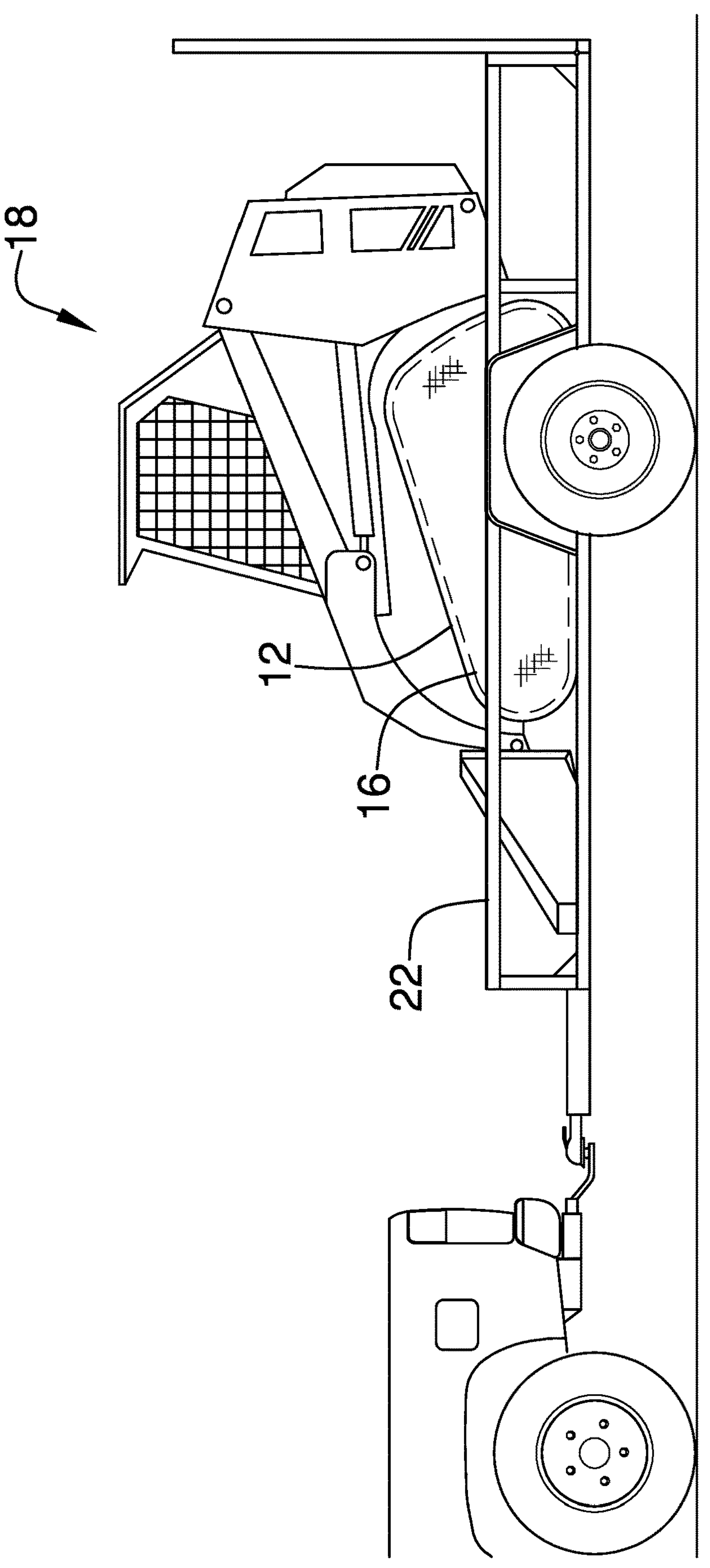
FIG. 6 is a left side in-use view of an embodiment of the disclosure.
Figure 7:
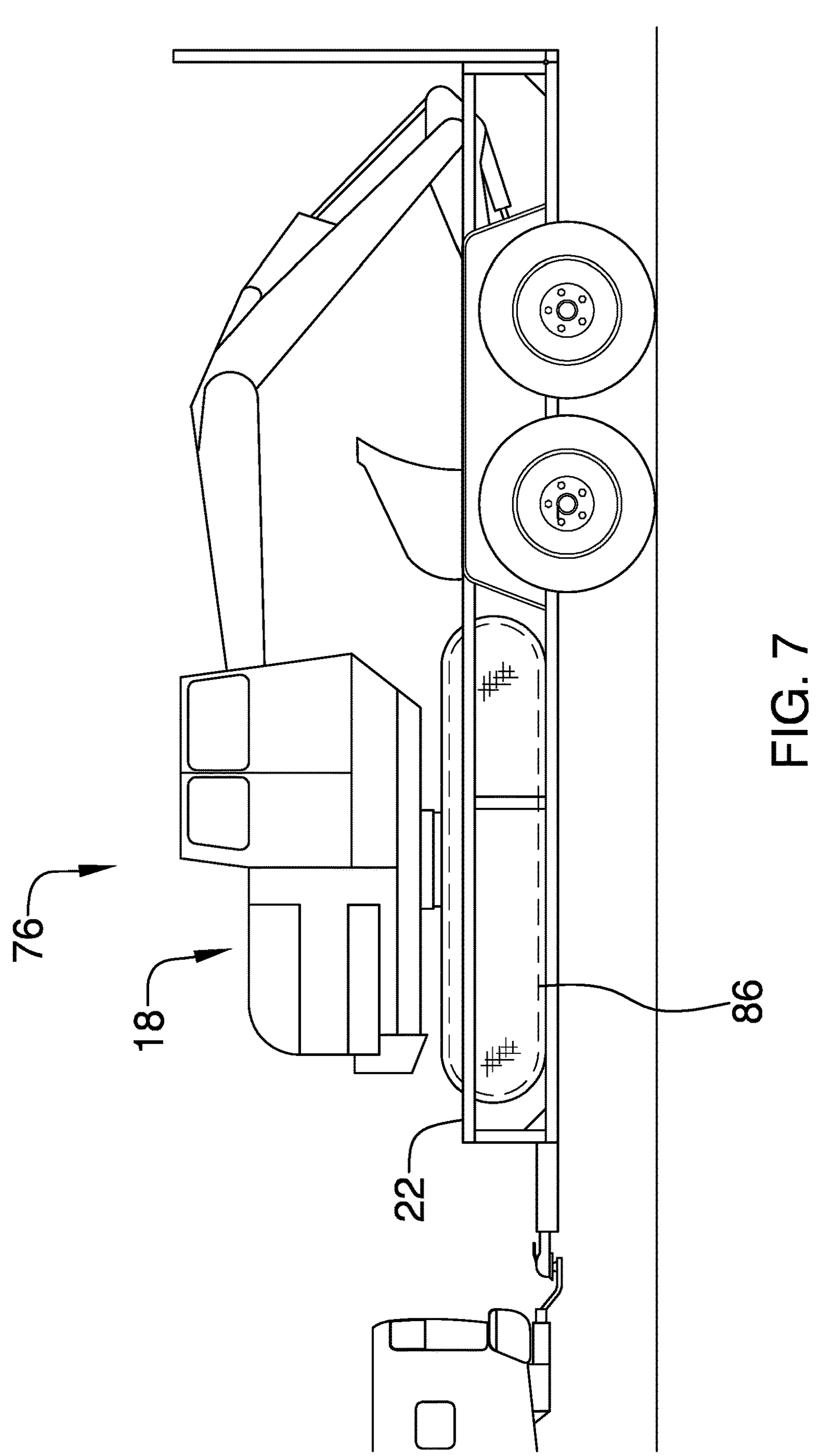
FIG. 7 is a perspective in-use view of an alternative embodiment of the disclosure.
Figure 8:
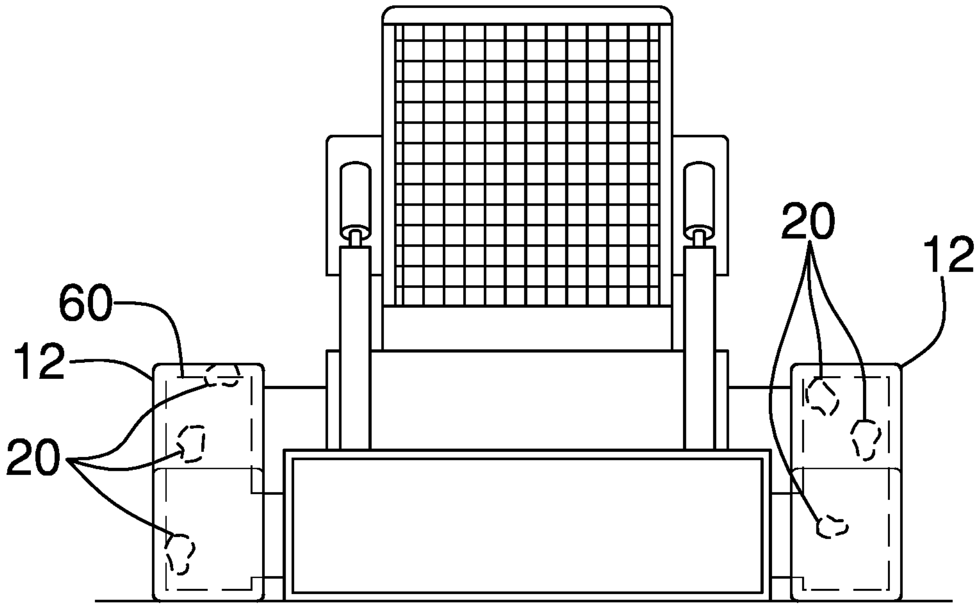
FIG. 8 is a front in-use view of an embodiment of the disclosure.

In an alternative embodiment 76 shown in FIGS. 4 and 7, the lateral wall 24 has a top edge 78, a bottom edge 80, a front edge 82 and a rear edge 84 and each of the front edge 82 and the rear edge 84 is rounded. The top edge 78 is oriented parallel to the bottom edge 80 such that the lateral wall 24 has an ovoid shape thereby facilitating the cover 12 to conform to the shape of an oval track 86 that is commonly employed on excavators, for example. The outer wall 14 has a top side 88 which intersects the top edge 78, a front side 90 which intersects the front edge 82 and a back side 92 which intersects the rear edge 84. The lower side 50 of the lower edge 48 of the lateral panel 46 is spaced from and is oriented parallel to the top side 88 of the outer wall 14. The forward side 52 of the lower edge 48 is curved to follow the curvature of the front edge 82 of the lateral wall 24 and the rear side 54 of the lower edge 48 is curved to follow the curvature of the rear edge 84 of the lateral wall 24.

In use, a cover 12 is positioned over each of the pair of tracks 16 on the crawler vehicle 18 when the crawler vehicle 18 is driven onto a trailer 22 for transporting the crawler vehicle 18. The drawstring 66 in each of the covers 12 is pulled to tighten each of the covers 12 around the pair of tracks 16. In this way the covers 12 inhibit debris 20 lodged in the tracks 16 from becoming dislodged during transport and potentially striking a vehicle on a roadway. Furthermore, the tracks 16 on the crawler vehicle 18 do not have to be cleaned of debris 20 prior to loading the crawler vehicle 18 onto the trailer 22 thereby saving time spent on a jobsite. The cover 12 can be disposed of after a single use or when the cover 12 becomes too damaged to contain the debris 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A crawler track cover device for inhibiting debris from falling off of a track of a crawler when the crawler is being transported on a trailer, said device comprising:

a cover having an outer wall which is elongated along a longitudinal axis of said cover such that said cover has an oblong shape thereby facilitating said cover to conform to the shape of a track on a crawler vehicle, said cover being comprised of a resilient and tear resistant material thereby facilitating said cover to inhibit debris from being dislodged from said track when said cover is positioned over said track wherein said cover is configured to inhibit the debris from striking a vehicle on a roadway when said crawler vehicle is being transported on a trailer;

an elastomeric tube being attached to said cover for biasing said cover to close around said track when said cover is positioned over said track;

wherein said elastomeric tube has a hole extending into an interior of said elastomeric tube;

wherein said assembly includes a pair of drawstrings, each of said pair of drawstrings being disposed within said elastomeric tube, each of said pair of drawstrings extending outwardly through said hole in said elastomeric tube such that an end of each of said drawstrings is exposed, said pair of drawstrings being drawable outwardly from said elastomeric tube for tightening said cover around said track for retaining said cover on said track, said drawstring including a pair of balls each being attached to said end of a respective one of said drawstrings; and a slide having each of said drawstrings sliding through said slide, said slide having a locking mechanism being biased into a locking condition for engaging said pair of drawstrings to inhibit said pair of drawstrings from sliding through said slide, said locking mechanism being actuatable into an unlocked condition to facilitate said pair of drawstrings to freely slide through said slide.

2. The assembly according to claim 1, wherein:

said cover has a lateral wall lying on a plane being perpendicularly oriented with said outer wall;

said lateral wall has a perimeter edge which has a lower side extending between a front curve and a back curve;

said perimeter edge has a back side extending between said back curve and a top curve;

said perimeter edge has an upper side extending between said top curve and said front curve;

said upper side slopes downwardly between said top curve and said front curve such that said lateral wall defines an approximately triangular shape with rounded corners; and said lateral wall is elongated between said front curve and said back curve.

3. The assembly according to claim 2, wherein:

said outer wall has an upper side intersecting said upper side of said perimeter edge of said lateral wall;

said outer wall has a back side which intersects said back side of said perimeter edge of said lateral wall;

said outer wall has a front side which intersects said front curve of said perimeter edge of said lateral wall;

said cover has a lateral panel lying on a plane being oriented parallel to said lateral wall;

said lateral panel has a lower edge which has a lower side extending between a forward side and a rear side of said lower edge, said lower side of said lower edge being spaced from and extending along a line being oriented parallel to said upper side of said outer wall;

said rear side of said lower edge is spaced from and extends along a line being oriented parallel to said back side of said outer wall such that said rear side of said lower edge intersects a termination of said back side of said outer wall; and said forward side of said lower edge extends between said lower side of said lower edge and a termination of said front side of said outer wall.

4. The assembly according to claim 3, wherein said termination of said front side of said outer wall and said termination of said back side of said outer wall define a track opening in said cover for receiving said track having said outer wall resting on an outwardly facing surface of said track.

5. The assembly according to claim 3, wherein said outer wall has a lip extending between said termination of said back side of said outer wall and said termination of said front side of said outer wall, said lip intersecting said lower side of said perimeter edge of said lateral wall.

6. The assembly according to claim 5, wherein said elastomeric tube extends along said lip and said termination of said front side and said termination of said back side of said outer wall of said cover such that said elastomeric tube biases said track opening to close around said track when said cover is positioned over said track thereby facilitating said cover to enclose debris on said track.

7. A crawler track cover device for inhibiting debris from falling off of a track of a crawler when the crawler is being transported on a trailer, said device comprising:

a cover having an outer wall which is elongated along a longitudinal axis of said cover such that said cover has an oblong shape thereby facilitating said cover to conform to the shape of a track on a crawler vehicle, said cover being comprised of a resilient and tear resistant material thereby facilitating said cover to inhibit debris from being dislodged from said track when said cover is positioned over said track wherein said cover is configured to inhibit the debris from striking a vehicle on a roadway when said crawler vehicle is being transported on a trailer, said cover having a lateral wall lying on a plane being perpendicularly oriented with said outer wall, said lateral wall having a perimeter edge which has a lower side extending between a front curve and a back curve, said perimeter edge having a back side extending between said back curve and a top curve, said perimeter edge having an upper side extending between said top curve and said front curve, said upper side sloping downwardly between said top curve and said front curve such that said lateral wall defines an approximately triangular shape with rounded corners thereby facilitating said cover to conform to the shape of a triangular track, said lateral wall being elongated between said front curve and said back curve, said outer wall having an upper side intersecting said upper side of said perimeter edge of said lateral wall, said outer wall having a back side which intersects said back side of said perimeter edge of said lateral wall, said outer wall having a front side which intersects said front curve of said perimeter edge of said lateral wall, said cover having a lateral panel lying on a plane being oriented parallel to said lateral wall, said lateral panel having a lower edge which has a lower side extending between a forward side and a rear side of said lower edge, said lower side of said lower edge being spaced from and extending along a line being oriented parallel to said upper side of said outer wall, said rear side of said lower edge being spaced from and extending along a line being oriented parallel to said back side of said outer wall such that said rear side intersects a termination of said back side of said outer wall, said forward side of said lower edge extending between said lower side of said lower edge and a termination of said front side of said outer wall, said termination of said front side of said outer wall and said termination of said back side of said outer wall defining a track opening in said cover for receiving said track having said outer wall resting on an outwardly facing surface of said track, said outer wall having a lip extending between said termination of said back side of said outer wall and said termination of said front side of said outer wall, said lip intersecting said lower side of said perimeter edge of said lateral wall;

an elastomeric tube being attached to said cover, said elastomeric tube extending along said lip and said termination of said front side and said termination of said back side of said outer wall of said cover such that said elastomeric tube biases said track opening to close around said track when said cover is positioned over said track thereby facilitating said cover to enclose debris on said track, said elastomeric tube having a hole extending into an interior of said elastomeric tube;

a pair of drawstrings, each of said pair of drawstrings being disposed within said elastomeric tube, each of said pair of drawstrings extending outwardly through said hole in said elastomeric tube such that an end of each of said drawstrings is exposed, said pair of drawstrings being drawable outwardly from said elastomeric tube for tightening said track opening in said cover around said track for retaining said cover on said track, said drawstring including a pair of balls each being attached to said end of a respective one of said drawstrings; and a slide having each of said drawstrings sliding through said slide, said slide having a locking mechanism being biased into a locking condition for engaging said pair of drawstrings to inhibit said pair of drawstrings from sliding through said slide, said locking mechanism being actuatable into an unlocked condition to facilitate said pair of drawstrings to freely slide through said slide.

8. The assembly according to claim 7, wherein:

said lateral wall has a top edge, a bottom edge, a front edge and a rear edge, each of said front edge and said rear edge being rounded, said top edge being oriented parallel to said bottom edge such that said lateral wall has an ovoid shape thereby facilitating said cover to conform to the shape of an oval track;

said outer wall has a top side intersecting said top edge and a front side intersecting said front edge and a back side intersecting said rear edge; and said lower side of said lower edge of said lateral panel is spaced from and oriented parallel to said top side of said outer wall, said forward side of said lower edge being curved to follow the curvature of said front edge of said lateral wall, said rear side of said lower edge being curved to follow the curvature of said rear edge of said lateral wall.

* * * * *